United States Patent
Hulce

(10) Patent No.: US 11,127,385 B2
(45) Date of Patent: Sep. 21, 2021

(54) SUPPORT DEVICE

(71) Applicant: Barry Hulce, South Burlington, VT (US)

(72) Inventor: Barry Hulce, South Burlington, VT (US)

( * ) Notice: Subject to any disclaimer, the term of this patent is extended or adjusted under 35 U.S.C. 154(b) by 0 days.

(21) Appl. No.: 16/811,464

(22) Filed: Mar. 6, 2020

(65) Prior Publication Data
US 2020/0294478 A1 Sep. 17, 2020

Related U.S. Application Data

(60) Provisional application No. 62/816,491, filed on Mar. 11, 2019.

(51) Int. Cl.
*G10G 5/00* (2006.01)
*F16M 11/04* (2006.01)
*F16M 11/14* (2006.01)

(52) U.S. Cl.
CPC ........... *G10G 5/005* (2013.01); *F16M 11/046* (2013.01); *F16M 11/14* (2013.01); *F16M 2200/025* (2013.01); *F16M 2200/08* (2013.01)

(58) Field of Classification Search
CPC ...... G10G 5/005; F16M 11/046; F16M 11/14; F16M 2220/025; F16M 2200/08
USPC ......................................................... 84/327
See application file for complete search history.

(56) References Cited

U.S. PATENT DOCUMENTS

| | | | | |
|---|---|---|---|---|
| 1,272,583 A | * | 7/1918 | Vrubel | G10G 5/00 84/327 |
| 3,024,690 A | * | 3/1962 | Sanstead | G10G 5/00 84/387 A |
| 3,358,951 A | * | 12/1967 | Carter | A47B 37/02 248/650 |
| 3,811,357 A | * | 5/1974 | Stewart | G10G 5/00 84/327 |
| 4,333,378 A | * | 6/1982 | Hrdlicka | G10D 3/18 84/280 |
| 4,485,996 A | * | 12/1984 | Beukema | A47C 3/30 248/407 |
| 4,632,002 A | * | 12/1986 | Clevinger | G10H 3/185 84/291 |
| 4,646,613 A | | 3/1987 | Banchetti | |
| 4,966,062 A | | 10/1990 | Driggers | |
| 4,994,648 A | * | 2/1991 | Gil | A45D 29/05 219/217 |
| 5,388,492 A | | 2/1995 | Olson | |
| 5,746,152 A | * | 5/1998 | Huse | A47C 3/28 114/363 |
| 5,789,687 A | * | 8/1998 | Johnson | G10G 5/005 84/387 A |
| 5,817,961 A | * | 10/1998 | Beck | G10G 5/005 84/327 |

(Continued)

*Primary Examiner* — Christina M Schreiber

(57) ABSTRACT

A support device has a planar base that is positioned under the legs of a user and on top of the surface of the chair, when a user is in a seated position. An adjustable tube connects the base to an adjustable joint, with a platform on the opposing side of the adjustable joint. The adjustable joint provides position adjustments to the platform in the orientations of pitch, roll, and yaw. The adjustable tube allows the distance from the base to the platform to change. The device supports the weight of an instrument which may be placed on the platform.

19 Claims, 3 Drawing Sheets

(56) References Cited

U.S. PATENT DOCUMENTS

| | | | |
|---|---|---|---|
| 5,975,635 A * | 11/1999 | Parpala | A47C 9/10 297/188.08 |
| 6,084,165 A | 7/2000 | Chapman | |
| 6,182,583 B1 * | 2/2001 | Larson | A47B 9/10 108/147 |
| 6,252,150 B1 | 6/2001 | Joihnson | |
| 6,398,671 B1 * | 6/2002 | Rios | A63B 69/0075 273/317.6 |
| D468,137 S * | 1/2003 | Ulmer | D6/708.17 |
| 6,573,439 B2 | 6/2003 | Wilson | |
| 6,693,234 B2 * | 2/2004 | Smith | G10G 5/005 84/327 |
| 6,696,626 B1 * | 2/2004 | Pagenkopf | G10D 3/01 84/280 |
| 7,205,468 B1 * | 4/2007 | Johnson | G10G 5/005 84/327 |
| 7,336,258 B1 * | 2/2008 | Goetsch | F16M 11/28 345/163 |
| 7,375,269 B2 | 5/2008 | Perkins | |
| 8,203,061 B2 | 6/2012 | Markakis | |
| 8,469,325 B2 | 6/2013 | Yu | |
| 8,530,733 B2 * | 9/2013 | Bibb | G10G 5/005 84/327 |
| 8,541,674 B2 * | 9/2013 | Kamensky | G10G 5/005 84/327 |
| 9,168,980 B1 * | 10/2015 | Falck | B63B 17/0081 |
| 9,301,614 B1 * | 4/2016 | Christopher | A01M 31/02 |
| 9,514,721 B1 * | 12/2016 | Champion | G10G 5/005 |
| 9,715,869 B1 * | 7/2017 | Sorenson | F16M 11/28 |
| 10,176,790 B2 | 1/2019 | Gangi | |
| 10,957,289 B2 * | 3/2021 | Laird | G10G 5/005 |
| 2008/0142675 A1 * | 6/2008 | Lu | F16M 13/00 248/676 |
| 2008/0196572 A1 | 8/2008 | Navarro | |
| 2009/0056522 A1 | 3/2009 | Mercer | |
| 2009/0282963 A1 | 11/2009 | Morrow | |
| 2009/0283653 A1 * | 11/2009 | Zhang | F16M 11/22 248/352 |
| 2010/0137105 A1 * | 6/2010 | McLaughlin | A63F 13/245 482/8 |
| 2010/0313731 A1 * | 12/2010 | Markakis | G10G 5/005 84/327 |
| 2012/0175474 A1 * | 7/2012 | Barnard | F16M 11/14 248/122.1 |
| 2012/0211612 A1 * | 8/2012 | Johnson | A61B 90/50 248/74.1 |
| 2012/0312144 A1 * | 12/2012 | Bibb | G10G 5/005 84/327 |
| 2013/0305897 A1 | 11/2013 | Barnett | |
| 2014/0168890 A1 * | 6/2014 | Barnard | F16M 11/041 361/679.55 |
| 2014/0190329 A1 * | 7/2014 | Hayes | G10D 3/18 84/279 |
| 2015/0179155 A1 * | 6/2015 | Martin | G10G 5/005 84/327 |
| 2016/0189690 A1 * | 6/2016 | Ohyama | G10D 3/01 84/327 |
| 2017/0027422 A1 * | 2/2017 | Khanicheh | A61B 90/50 |
| 2019/0128469 A1 * | 5/2019 | Lu | F16M 11/2064 |
| 2020/0294478 A1 * | 9/2020 | Hulce | F16M 11/14 |
| 2020/0309312 A1 * | 10/2020 | Ye | F16M 11/14 |
| 2020/0327870 A1 * | 10/2020 | Laird | G10G 5/005 |

* cited by examiner

SUPPORT DEVICE

CROSS-REFERENCE TO RELATED APPLICATION

This application claims the benefit of U.S. provisional application No. 62/816,491, filed Mar. 11, 2019.

FEDERALLY-SPONSORED RESEARCH

None

BRIEF DESCRIPTION

The present application describes a support device. In one embodiment, the device is a stand used to support a musical instrument such as a guitar while the instrument is being played, with the user seated on furniture such as a chair, bench, stool, couch, etc. The terms support device and support stand may be used interchangeably in the present application.

In one embodiment there is a support device, comprising: a substantially planar base; a first tube positioned near the planar base's center and affixed to the planar base; a second tube which has a proximal end that adjustably engages with the first tube, the second tube also having a distal end engaged with a joint; and a platform engaged with the joint.

In one embodiment, the joint allows a spatial orientation position of the platform to be adjustable, and reversibly locked into place.

In one embodiment, the platform's spatial orientation position is adjustable in pitch.

In one embodiment, the platform's spatial orientation position is adjustable in roll.

In one embodiment, the platform's spatial orientation position is adjustable in yaw.

In one embodiment, the platform's spatial orientation position is adjustable in pitch, roll, and yaw.

In one embodiment, the joint is a ball and socket joint.

In one embodiment, the ball and socket joint is reversibly locked into position by a cinching mechanism.

In one embodiment, the device is used to support a musical instrument.

In one embodiment, the substantially planar base is configured in an x-shape and made of a rigid material.

In one embodiment, the substantially planar base's thickness is no greater than ⅛ inch.

In one embodiment, a distance from the substantially planar base's lower surface to the platform's upper surface is at least four inches, with the platform in its lowest adjustable position.

In one embodiment, a distance from the substantially planar base's lower surface to the platform's upper surface is a maximum of sixteen inches, with the platform in its lowest adjustable position.

In one embodiment, there is a method of supporting a musical instrument, comprising: sandwiching a substantially planar base between a user's legs and a seating surface; affixing a first tube to the planar base near the planar base's center so the first tube extends upwards between the user's legs; positioning a second tube which has a proximal end to adjustably engage with the first tube, the second tube also having a distal end; affixing a joint to the distal end of the second tube; and affixing a platform to the adjustable joint.

DESCRIPTION OF RELATED ART

A variety of devices are known for supporting a musical instrument such as a guitar, when the instrument is being played by a musician. Well-known devices include guitar straps, in which each end of a strap is attached to each end of a guitar, with the strap positioned over one shoulder and around the back of the musician. However, supporting the weight of an instrument in this manner can be uncomfortable, or even cause muscular or joint problems for the musician.

Other approaches to musical instrument support include different types of stands for supporting an instrument, both for musicians who are standing or seated. However, all such stand devices known to the applicant do not allow for optimal adjustability and support of an instrument in a position preferred by an individual musician, while the musician is comfortably seated.

DETAILED DESCRIPTION

The present application discloses a support stand for a musical instrument. In one embodiment, the stand supports an instrument when a musician is in a seated position on a chair, bench, couch, stool, or similar furniture. In one embodiment, the musical instrument is a guitar, or similar stringed instrument such as a bass, banjo, ukulele, or mandolin. Such examples are intended to be non-limiting with the stand capable of supporting other instruments as well.

Figure 1:
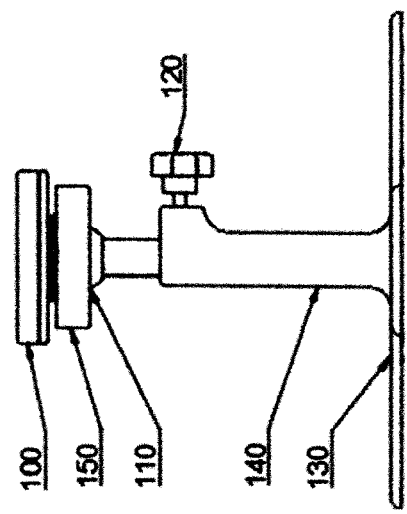
FIG. 1 is a front elevation view of an embodiment of the device

Referring to FIG. 1, the device includes base 130. In one embodiment, base 130 is substantially planar, and configured in an X shape as shown. In one embodiment, the base is made of a substantially rigid material. A first tube 140 is positioned near the base's center as shown, and oriented perpendicular to the planar surface of base 130. First tube 140 may be manufactured integrally as one piece with base 130, or base 130 and first tube 140 may be made as separate pieces as then joined together. Such joining may be permanent, as through bonding, welding, etc. Or the joint may be a type that is readily disassembled, such as a threaded joint, slip joint, etc., which allows the device to be packed into a smaller package for shipping, transport, etc.

In one embodiment of the support device, base 130 is configured in an X shape as shown. Such a shape may reduce wobbling if base 130 rests on a chair that does not have a substantially planar seating surface. Of course, other shapes may be used for base 130, such as square, rectangular, circular, oval, etc.

Second tube 115 has a proximal end that adjustably engages with first tube 140. Knob 120 includes threads which engage with a threaded hole on first tube 140. First tube 140 and second tube 115 engage with each other in a slideable manner, with knob 120 acting as a set screw, capable of being tightened or loosened to allow and secure such slideable engagement. Of course, the configuration may be reversed, with a male-type tube engaged with base 130, and a female-type tube extending upwards from the male tube. Similarly, an alternate system from the knob and set screw assembly may be used for adjustably securing the position of second tube 115 relative to first tube 140. Such alternate systems, such as a threaded-cap lock, a circumferential clamp, a collet and collar system, etc. are known in the art, and also may be used. The set screw shown is a non-limiting example of adjustably securing the two tubes together.

Figure 3:
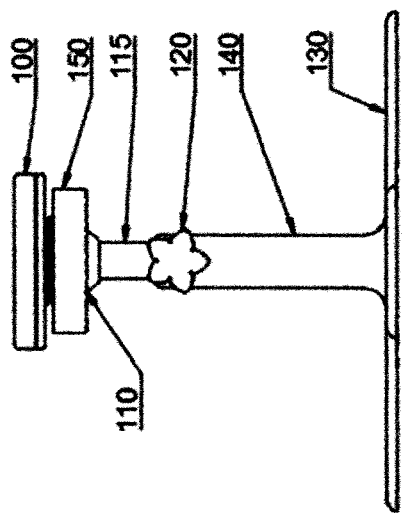
FIG. 3 is a lower, left side, perspective view of the above
Figure 4:
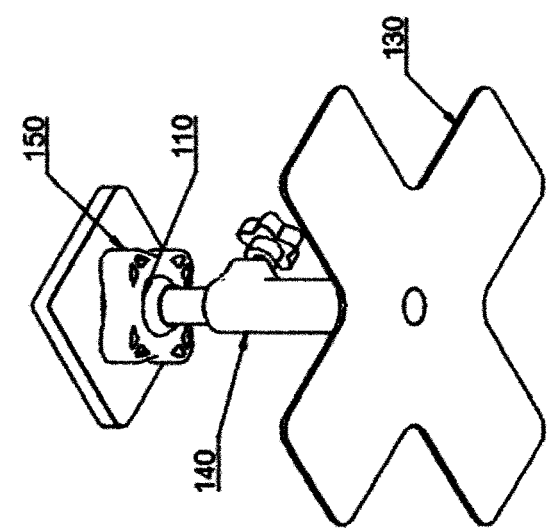
FIG. 4 is an upper, left side, perspective view of the above
Figure 6:
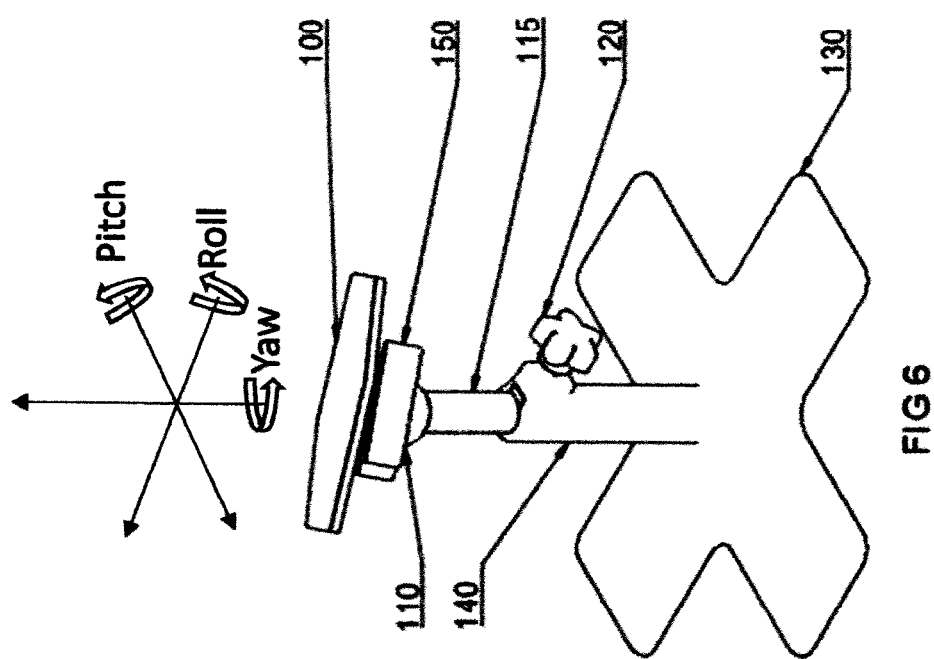
FIG. 6 is an upper, left side, perspective view of the above, with spatial orientation references included relating to adjustability

Second tube 115 also has a distal end engaged with a joint 110, as seen in FIG. 3. In one embodiment joint 110 is a ball-and-socket type joint. Platform 100 engages with joint 110, the joint allowing the platform's position to be adjusted in pitch, roll, and yaw orientations and locked into the orientation, as shown in FIG. 6. Platform 100 may include a padded layer to protect a musical instrument from scratches, as well as provide the desired friction so that the instrument does not slip off the stand unwantedly. Collar 150 is threadably engaged with joint 110, and cinches/loosens the ball joint. A ball and socket joint includes a spherical part fitting into a spherical socket, allowing free movement within a specific conical volume. Such joints may also include a cinching mechanism, which tightens and loosens to reversably lock the joint in a fixed orientation. As such joints and cinching mechanisms are known in the art, and for brevity will not be detailed further. Collar 150 may include a textured and/or extended surface as shown that aids in gripping and twisting collar 150.

Figure 2:
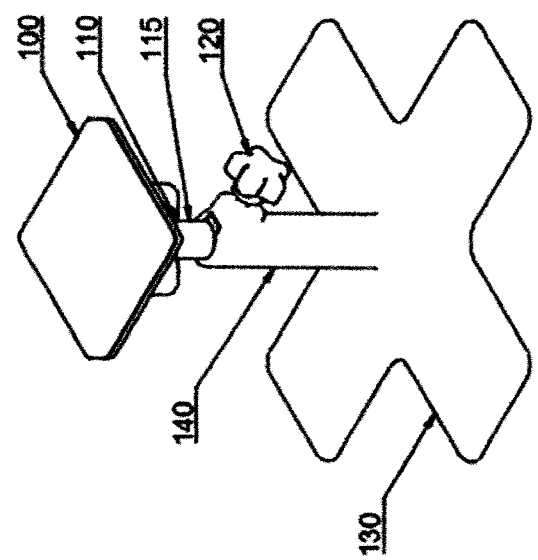
FIG. 2 is a right side elevation view of an embodiment of the above

FIG. 2, FIG. 3 show additional views of an embodiment of the device.

Figure 5:
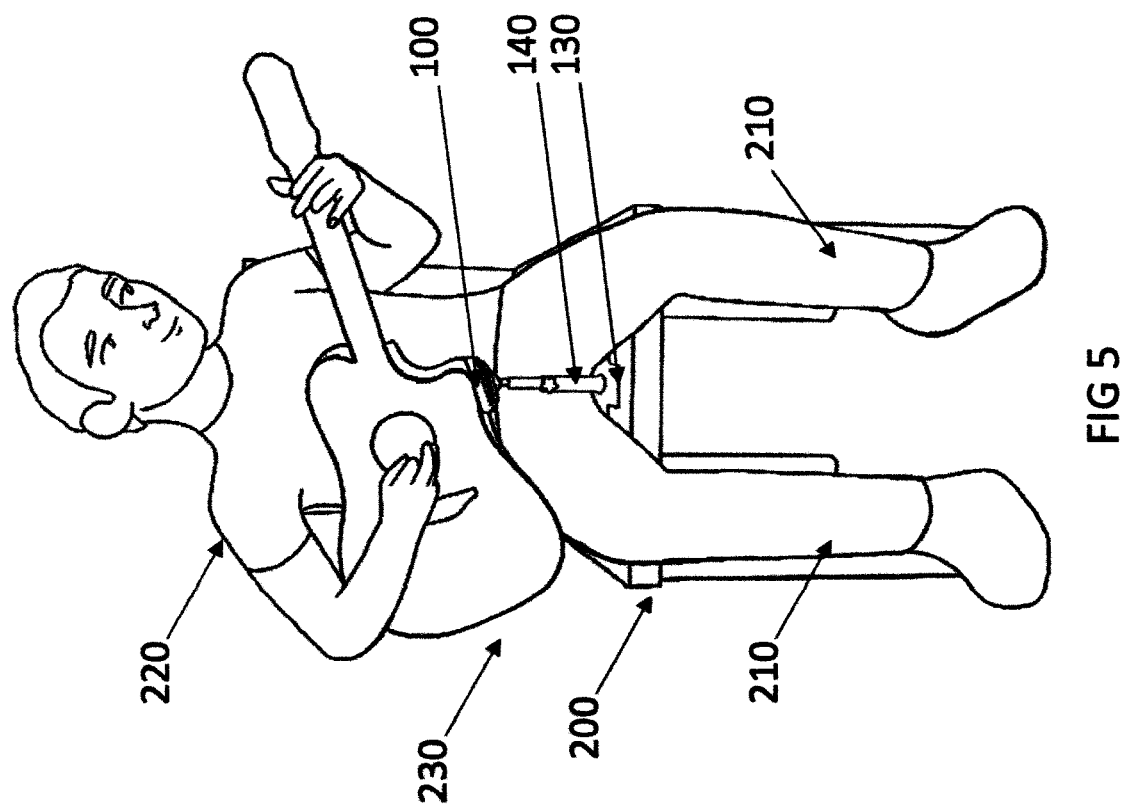
FIG. 5 is an example of the device in use by a musical instrument player

An example of use is shown in FIG. 5. A musician 220 is seated on chair, or a seating surface 200. Musician 220 places the support device between his/her legs 210, with the first tube 140 extending upwards between the musician's legs, thereby sandwiching the base 130 between the user's legs and the seating surface. The planar portion of base 130 rests between the musician's legs 210, and seating surface 200. Base 130 of the support device therefore rests on the seating surface 200. Base 130 is substantially planar, and preferably made from a thin material. The thin material means base 130 can rest under a musician's legs without being obtrusive or uncomfortable. Preferably, the planar thickness of base 130 is not greater than ⅛" in order to be unobtrusive.

The musician may rest the body of an instrument 230 on the top surface of platform 100. In the case of a guitar, preferably the side of the lower or upper bout of the guitar body rests on platform 100. The musician may then use the support stand's adjustments to place the instrument in her/his preferred position. The height of platform 100 is adjusted with knob 120, and sliding second tube 115 up or down relative to socket 140, to achieve the desired instrument height. The spatial orientation of platform 100 is changed by turning collar 150 to loosen joint 110. As joint 110 is a ball-and-socket type, platform 100 may be placed in different planar orientations relative to base 130, thus allowing a musician to further adjust the position of the support and therefore the instrument. Joint 110 allows the position of platform 100 to be adjusted in at least one spatial orientation and locked into a preferred spatial orientation, therefore adjustable in pitch, yaw, and roll. FIG. 6 shows detail of the pitch, yaw, and roll spatial orientation.

In one embodiment of the support stand, the distance from the lower surface of base 130 to the upper surface of platform 100 is a minimum of four inches, with the platform 100 in its lowest adjustable position. In another embodiment of the support stand, the distance from the lower surface of base 130 to the upper surface of platform 100 is maximum of sixteen inches, with the platform 100 in its lowest adjustable position.

Although the present device has been described with respect to one or more embodiments, it will be understood that other embodiments of the present device may be made without departing from the spirit and scope of the present device. Hence, the present device is deemed limited only by claims and the reasonable interpretation thereof.

I claim:

1. A support device, comprising:
   a substantially planar base;
   a first tube positioned near the planar base's center and affixed to the planar base;
   a second tube which has a proximal end that adjustably engages with the first tube, the second tube also having a distal end engaged with a ball and socket joint which allows a spatial orientation position of a platform to be adjustable and reversibly locked into place; the second tube capable of sliding relative to the first tube to create height adjustment of the platform engaged with the ball and socket joint, the platform used to support a musical instrument;
   and a mechanism to lock the position of the first tube relative to the second tube to create a rigid structure;
   wherein the planar base is capable of being sandwiched between a seating surface and a user's legs.

2. The support device of claim 1, in which the platform's spatial orientation position is adjustable in pitch.

3. The support device of claim 1, in which the platform's spatial orientation position is adjustable in roll.

4. The support device of claim 1, in which the platform's spatial orientation position is adjustable in yaw.

5. The support device of claim 1, in which the platform's spatial orientation position is adjustable in pitch, roll, and yaw.

6. The support device of claim 1, in which the ball and socket joint is reversibly locked into position by a cinching mechanism.

7. The device of claim 1, in which the substantially planar base is configured in an x-shape and made of a rigid material.

8. The device of claim 1, in which the substantially planar base's thickness is no greater than ⅛ inch.

9. The device of claim 1, in which a distance from the substantially planar base's lower surface to the platform's upper surface is at least four inches, with the platform in its lowest adjustable position.

10. The device of claim 1, in which a distance from the substantially planar base's lower surface to the platform's upper surface is a maximum of sixteen inches, with the platform in its highest adjustable position.

11. The method of claim 1, in which the platform is substantially planar.

12. A method of supporting a musical instrument, comprising:
   sandwiching a substantially planar base between a user's legs and a seating surface;
   affixing a first tube to the planar base near the planar base's center so the first tube extends upwards between the user's legs;
   positioning a second tube, which has a proximal end, to adjustably engage with and slide relative to the first tube, with a mechanism to lock the position of the first tube relative to the second tube to create a rigid structure, the second tube also having a distal end; and
   affixing a ball and socket joint to the distal end of the second tube, which allows a spatial orientation position of a platform, used to support the musical instrument, to be adjustable and reversibly locked into place.

13. The method of claim 12, in which the platform's spatial orientation position is adjustable in pitch.

14. The method of claim 12, in which the platform's spatial orientation position is adjustable in roll.

15. The method of claim 12, in which the platform's spatial orientation position is adjustable in yaw.

16. The method of claim 12, in which the platform's spatial orientation position is adjustable in pitch, roll, and yaw.

17. The method of claim 12, in which the joint is a ball and socket joint which may be reversibly locked into position by a cinching mechanism.

18. The method of claim 12, in which the substantially planar base is made of rigid material.

19. The method of claim 12, in which the platform is substantially planar.

\* \* \* \* \*